June 2, 1936.  T. A. KILLMAN ET AL  2,042,664
HYDRAULIC SHOCK ABSORBER
Filed Oct. 19, 1933  3 Sheets-Sheet 1
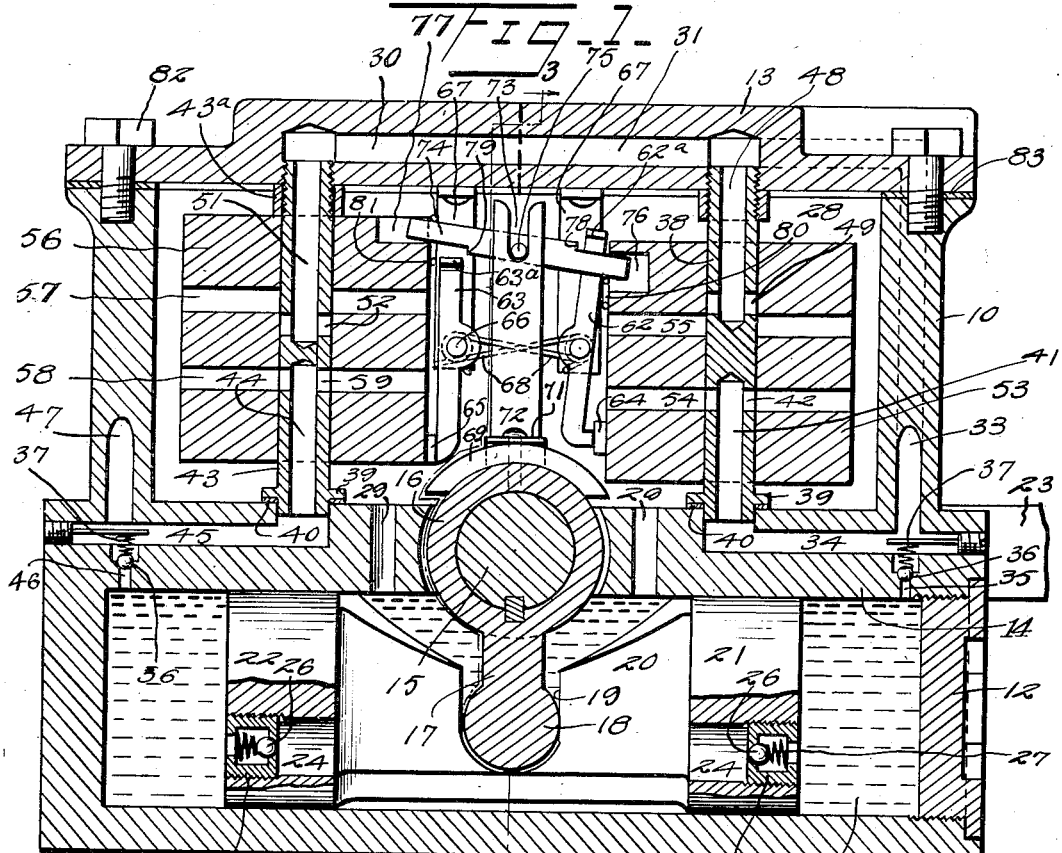
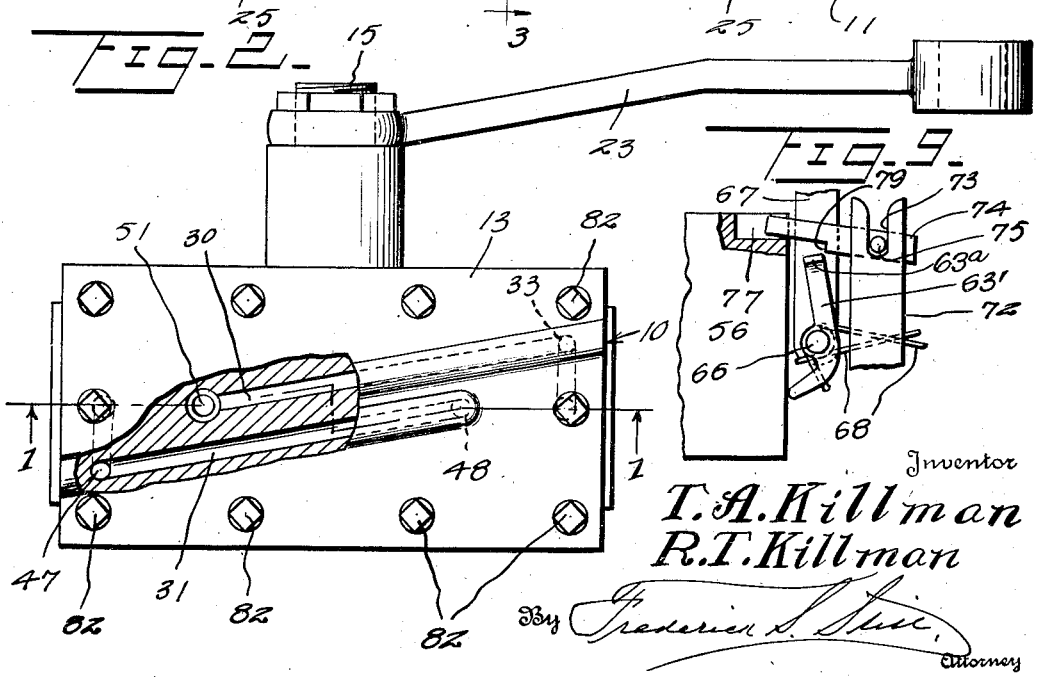
Inventor
T. A. Killman
R. T. Killman June 2, 1936.  T. A. KILLMAN ET AL  2,042,664
HYDRAULIC SHOCK ABSORBER
Filed Oct. 19, 1933  3 Sheets-Sheet 2
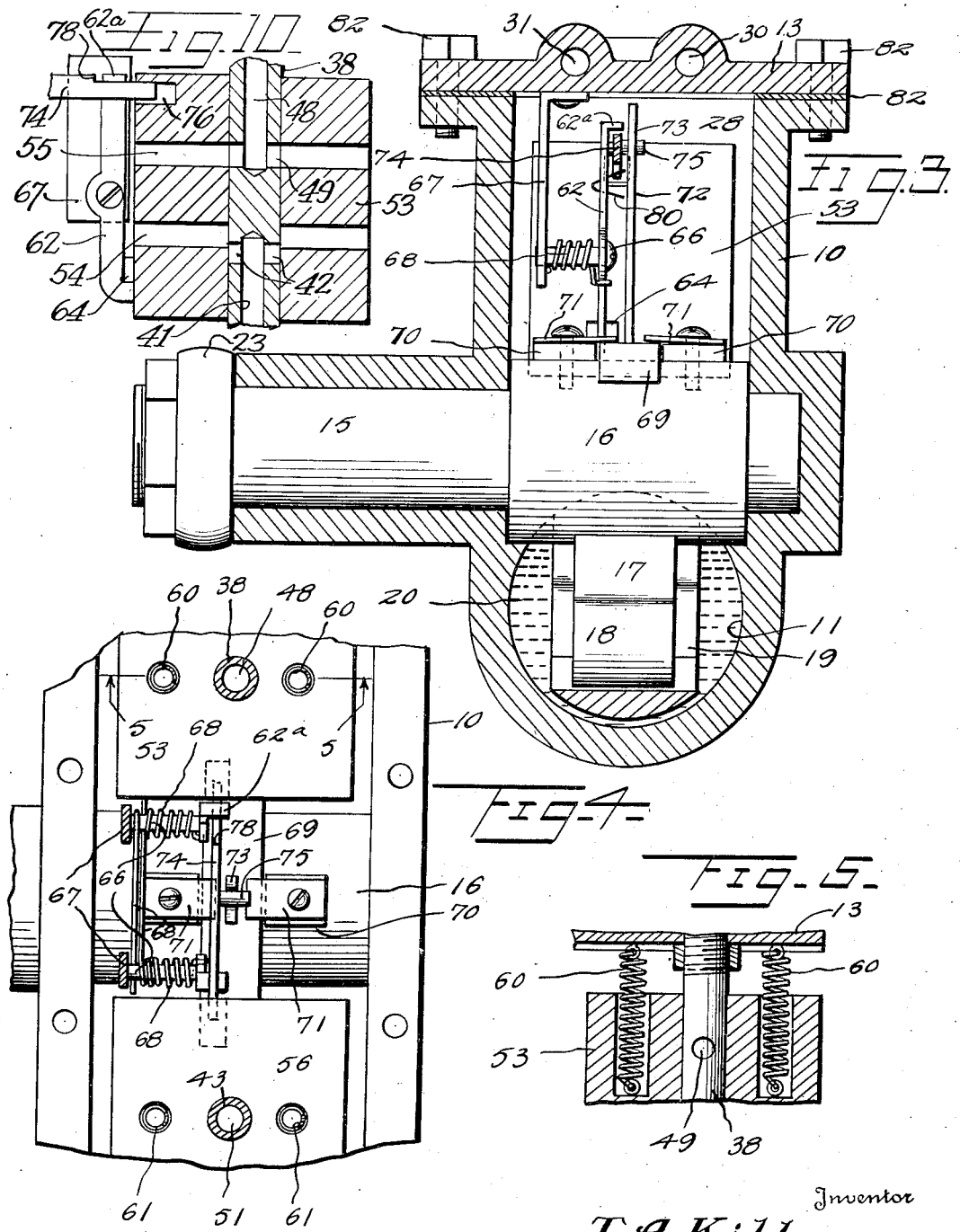

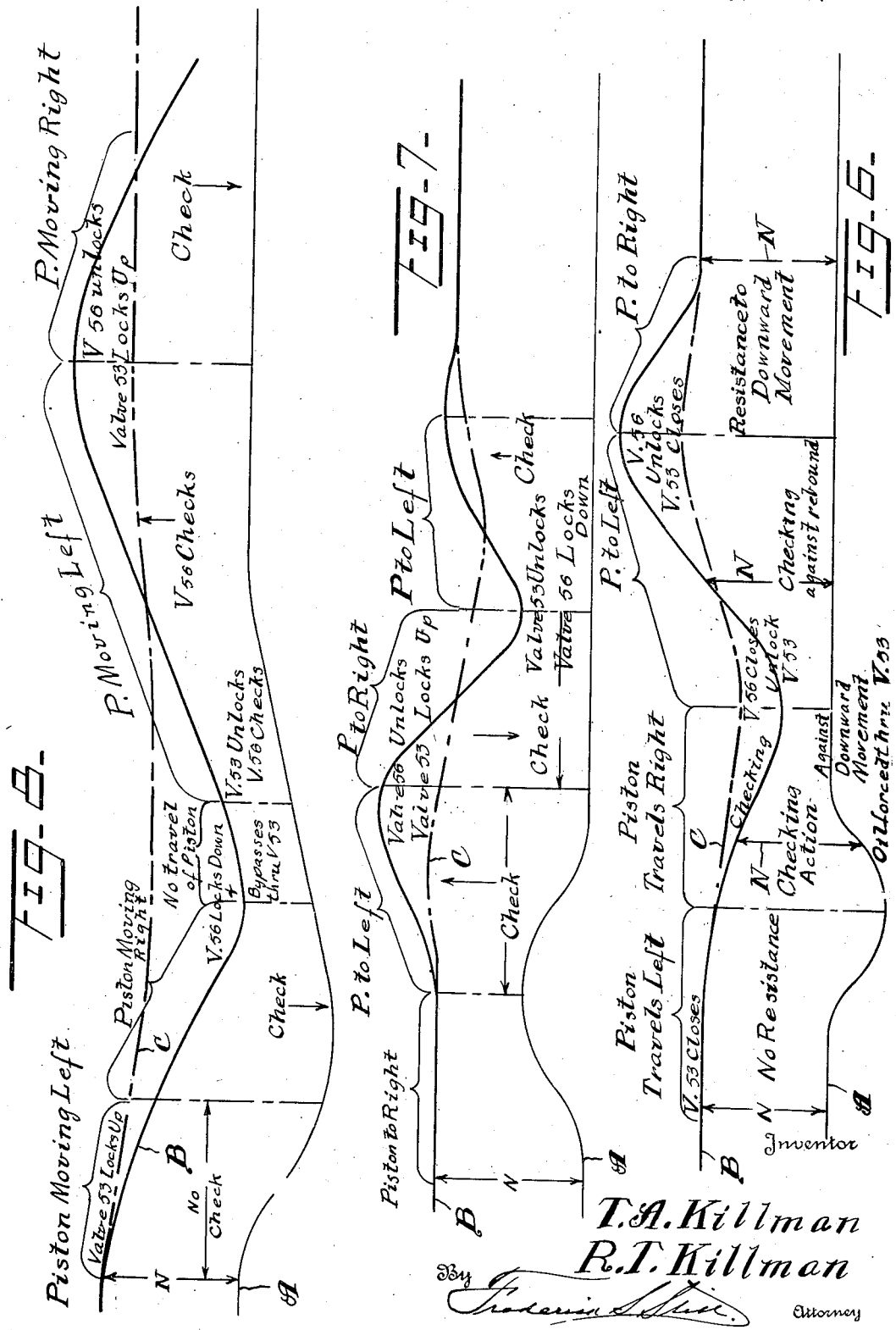

Patented June 2, 1936

2,042,664

UNITED STATES PATENT OFFICE 2,042,664

HYDRAULIC SHOCK ABSORBER

Thomas A. Killman and Robert T. Killman,
Nashville, Tenn.

Application October 19, 1933, Serial No. 694,325

28 Claims. (Cl. 188—88)

This invention relates to improvements in automobile or other vehicular hydraulic shock absorbers of the type which make use of inertia operated valves for the purpose of controlling the fluid passages.

As hitherto constructed such inertia-operated valves operate to close or restrict the passages only momentarily and do not cause the passages to remain closed or restricted after the forces due to inertia and acceleration have become insufficient to hold the valves in operative position and during the period when the fluid should encounter resistance to its passage and thus the vibration or oscillation of the body is not properly checked or dampened.

In order to allow the resistance of hydraulic shock absorbers to relative movements between the vehicle body and axle to be made great enough to effectively damp out such movements, and at the same time prevent this resistance from increasing the initial disturbance of the vehicle body due to road irregularities, various types of so-called inertia-controlled shock absorbers have been made. In all of these devices, use is made of the effect of the vertical accelerations of the car body upon weighted valves contained within the shock absorber to operate said valves so as to increase the resistance of the shock absorber to relative movements between the vehicle body and the axle. Since sufficient acceleration to cause the weighted valve to move to its flow-retarding position obtains during only a relatively small portion of the cycle of oscillation of the vehicle body, it follows that if some means are not provided to retain the valve in this retarding position, the valve will be closed and cause the increased resistance to the relative movement only during this small portion of the cycle, and the full damping effect will not be gained. In addition to the natural decrease in acceleration of a body moving in simple harmonic motion there is added the decrease in acceleration which is due to the increased retarding action of the shock absorber during the period when the valve is in its closed position. This leads to a fluttering action of the valve.

In order for the damping action of a shock absorber of this type to be most effective the increase in resistance should extend over the entire movement of the car body in the same direction as was the acceleration which originally caused the valve to operate. To do this it is necessary to retain the weighted valve in its flow-retarding or cut-off position after the force due to acceleration and inertia has decreased until it is insufficient to hold the valve in this position, and until the movement of the car body in this direction has ceased. The accomplishment of this action is the main object of our invention. It must be understood that although we have described and shown one type of retaining means in combination with one particular type of inertia-controlled shock absorber, we do not wish to limit ourselves either to this specific type of retaining means or to this specific type of inertia-controlled shock absorber, or to any specific combination of the two.

The general object of the present invention is to therefor provide a shock absorber having therein valves operated by inertia or by momentum, which act to retard the movement of the liquid and thus retard the movement of the piston, due to relative movement of the body and the wheels and provide means for latching these valves in their retarding position after the force due to inertia and acceleration has become insufficient to hold the valves operated and until the shock has been taken up, the valves then being released temporarily until a further vertical movement of the body causes the operation of the valves and a further checking or dampening of the shock.

A further object is to provide a shock absorber which cushions or dampens the action of the springs both upon the downward movement of the frame relative to the wheels and upon the upward movement of the frame relative to the wheels by the use of an inertia operated valve dampening the downward movement of the body in a vertical plane and a second inertia operated valve dampening the opposite movement of the frame or body relative to the wheels, and to provide means latching the first-named valve in its retarded position immediately that the frame starts to move downward, the second named operated valve being shifted to its retarded position and latched in this position just before or when the frame moves upward under the rebound of the usual springs.

A further object is to permit lighter and more sensitive springs to be used on the car than can be used at present and dampen the action of these springs to thus prevent the body from descending except to a slight extent when the wheels move downward into a depression and prevent the car body from rising except to a slight extent upon the rebound of the springs or prevent the car body from rising suddenly and to any but a slight extent when the wheels strike a hump in the roadway and prevent the car body from ascending except to a slight extent upon a rebound of the springs.

Other objects will appear in the course of the following description.

Our invention is illustrated in the accompanying drawings, wherein:—

Figure 1 is a vertical longitudinal section through our hydraulic shock absorber on line 1—1 of Figure 2;

Figure 2 is a top plan view partly broken away;

Figure 3 is a vertical section on the line 3—3 of Figure 1 with the controlling valves in normal position, the casing being shown in section, the interior parts being in elevation but the latching rod being shown in section.

Figure 4 is a fragmentary top plan view with the cover removed;

Figure 5 is a section on the line 5—5 of Figure 4;

Figure 6 is a diagrammatic view showing the manner in which the shock absorber operates when the vehicle is passing over a depression in the roadway;

Figure 7 is a diagrammatic view showing the operation of the mechanism when the vehicle is passing over a hump in the roadway;

Figure 8 is a diagrammatic view showing the operation of the mechanism when the vehicle is passing over a relatively long depression in the roadway;

Figure 9 is a detailed elevation showing a modification of the latching means;

Figure 10 is a fragmentary detail of one of the inertia-operated valves showing it in raised position.

Referring to these drawings, 10 designates a body or outer casing having formed in its base the cylinder 11 which is closed by the casing designed to be rigidly attached to the vehicle chassis or frame and at one end and at the other closed by a plug 12. The top of the casing is covered by a cap 13. Oscillatably mounted in bearings in the body 10 and the wall 14 of the upper side of the cylinder 11 is a shaft 15 having keyed thereto the sleeve 16. This shaft extends through the front wall of the body and into the rear wall thereof and is supported on suitable bearings. The sleeve 16 has depending from it the arm 17 formed with a rounded extremity 18 which is engaged with a seat 19 formed in a double piston designated generally 20. This piston has two heads 21 and 22 so that as the shaft 15 oscillates, the piston will be shifted toward the right or toward the left.

The shaft 15 extends out through the front wall of the body 10 and carries an arm 23 which is connected at its extremity as usual to the axle while the body 10 is mounted upon the frame or chassis of the machine. Therefore, it will be obvious that as the arm 23 oscillates due to the upward movement of the wheels relative to the frame or the downward movement of the frame relative to the wheels, the piston 20 will be shifted in one direction or the other.

The piston heads 21 and 22 are provided with ports 24 and in these ports are disposed the valve bodies 25 having check valves 26 therein, each valve 26 being held to its seat by a spring 27. These valves close toward the middle of the piston, that is, as the piston moves toward the right, the valve on the left hand head 22 will open and as the piston moves toward the left, the valve 26 of the right hand head 21 will open.

The upper portion of the body 10 is formed to provide a chamber 28 which communicates by ports 29 with the middle portion of the cylinder. The top or cover 13 is provided with two longitudinally extending by-pass passages 30 and 31. The passage 30 at its outer end communicates with a passage 33 formed in the wall of the casing, this passage 33 extending downward into a passage 34 formed in the wall 14. This passage 34 communicates with the right hand end of the cylinder 11 by means of a port 35 provided with a check valve 36 held in place by a spring 37. Thus as the piston moves toward the right in Figure 1, liquid will be forced up through the port 35 and into the passages 34 and 33.

Depending from the cover 13 is a valve stem 38 which has a shoulder 39 resting upon a gasket 40. The valve stem has a passage 41 communicating with passage 34 and extending upward from its lower end nearly to the middle of the valve stem and having two discharge ports 42 at its upper end. Also depending from the cover 13 is a valve stem 43 having an upper tubular end and which is provided at its lower end with a shoulder 39 and a gasket 40. The lower end of the valve stem 43 is also provided with a vertically extending bore or passage 44 which at its lower end opens into the passage 45 which in turn has a port 46 corresponding to the port 35 on the other end of the cylinder and opening into the left hand end of cylinder 11, this port being normally closed by check valve 36 held in place by the spring 37 as previously described. From the passage 45 extends a by-pass passage 47 which communicates with the by-pass passage 31 and the other end of this passage 31 communicates with a bore 48 in the upper end of the valve stem 38. The lower end of this bore is provided with ports 49 which coact with the openings 55 in the valve 53. The upper end of the stem 43 is likewise provided with the bore 51 communicating with the by-pass passage 30 and having at its lower end the ports 52 which coact with openings 57 in the valve 56.

Slidingly mounted upon the stem 38 is the inertia operated valve 53. This is provided with the radially extending passages 54 adapted to coact with the ports 42 and is also provided with the radially extending passages 55 adapted to coact with the ports 49. When the valve 53 is down, the passages 54 register with the ports 42. When the valve 53 is raised, the passages 54 do not fully register with the ports 42 but only partially register therewith to form a constricted opening and when the valve 53 is raised, the passages 55 register with the ports 49. When the valve 53 is lowered, the passages 55 are out of registry with the ports 49.

Operating upon the stem 43 is a momentum or inertia operated valve designated 56 which is of practically the same construction as the valve 53 and is provided with the upper passages 57 which register with the ports 52 when the valve is lowered and is also provided with the lower pair of passages 58 which register with the ports 59 when the valve is raised. The valves are supported in their normal position by springs. The springs 60 which support the valve 53 have just sufficient tension as to support the valve 53 in its normal or lowered position. The springs 61 which support the valve 56 are of just sufficient strength to support valve 56 in its normal or upper position. Therefore, upon a downward movement of the body, the valve 53 through its inertia will tend to retain its position in space and the stem 38 will move downward through the valve and upon a downward movement of the body, the valve 56 will be carried down with the body by the collar 43a until the body has ceased its downward movement when the valve 56 continues its downward movement under its momentum. The valve 56 is, therefore, a momentum operated valve while the valve 53 is an inertia operated valve, this being true when the car is passing over a depression but vice versa when passing over a bump.

For the purpose of latching the valve 53 in its relatively raised position upon a downward movement of the body and latching the valve 56 in its lowered position when it has been relatively moved downward by its momentum or inertia after the force due to inertia and acceleration has become insufficient to hold said valve in this position and until the need for such closure has ceased to be; we provide the latches 62 and 63. The latch 62 at its lower end is angularly extended and coacts with a lug 64 formed upon the lower end of the valve 53 so that when the valve 53 moves upward relative to the stem and to the latch 62, the hooked end of the latch will catch beneath this lug and hold the valve in its relative raised position.

The valve 56 is provided with a lug 65 and when this valve moves downward under its momentum, the lower end of the latch 63 engages above the lug 65. The lower ends of the latches 62 and 63 are urged toward their respective valves by springs. The latches are mounted upon pins 66 carried by a depending member 67 mounted upon the cover 13. Torsion springs 68 are engaged around the pins 66 and engage the latches 62 and 63 so as to urge the lower ends to valve engaging position. The upper ends of the latches 62 and 63 are angularly bent as will be later described for engagement with a latch releasing means.

Resting upon the sleeve 16 is a saddle 69 which is held in frictional engagement with this sleeve as shown in Figure 3 by the lugs 70 having mounted thereon the friction plates 71. The lugs 70 are disposed on each side of the saddle 69 and the friction plates 71 extend over and bear against the upper curved surface of the saddle 69, the under face of the saddle 69, of course, fitting the sleeve. The saddle 69 has a limited movement with the sleeve 16, this movement being limited by the engagement of the ends of the saddle with the upper face of the wall 14 on each side of the bearing for the sleeve 16.

Attached to the saddle is an upwardly extending arm 72 having a fork 73 at its upper end. Disposed behind the arm 72 is an unlatching rod 74 having a pin 75 extending into the fork 73, the right hand end of this rod extending into a recess 76 formed in the upper portion of the valve 53 and the opposite end of the rod extending into a recess 77 formed in the upper face of the valve 56. The rod fits loosely in the recess 77 so that the rod is thus supported by the valves and either end of the rod may rise or fall relative to the other end of the rod.

The upper face of the rod is formed on its right hand side with a shoulder 78 with which the upper angularly bent end 62a of latch 62 coacts and the under edge face of the rod 74 adjacent its left hand end is formed with a shoulder 79 with which the upper angularly bent end 63a of the latch 63 coacts. An angular spring 80 carried upon the valve 53 urges the right hand end of the rod 74 upward and an angular spring 81 carried upon the valve 56 and extending over the upper edge face of the rod 74 urges the left hand end of this rod downward.

The cover 13 is held down by the bolts 82 and thus the construction is such that the saddle 69 with the block 70 and friction plate 71 and the arm 72 may be inserted in proper position within the casing 10 and then the shaft 15 inserted through the eye of the sleeve 16 with the key holding the sleeve 16 to the shaft. The valves are supported from the cover by the springs 60 and 61 and the valve stems have screw-threaded engagement with the cover. The latches 62 and 63 are also supported from the cover and the rod 74 is supported by the valves so that the cover carries the valves, their stems, the latching means and the rod 74 and thus these parts may be put in place by simply lowering the cover into place and when the nuts 82 are tightened up, it will compress the gaskets 40 and thus form a liquid-tight engagement with the valve stems and the openings or passages 34 and 35. Of course, a gasket 83 is disposed between the cover and the wall of the casing or body 10.

The operation of this mechanism is as follows:—

In Figure 6, it is presumed that the vehicle travels over a relatively short depression in the roadway. The line A designates the movement of the axle as the wheels travel into and out of the depression. The line B indicates the movement which would be given to the body and the casing 10 if this movement were not checked. The line C indicates approximately, of course, the actual movement of the body resultant upon the checking or retarding action of our mechanism. N indicates the normal distance between the body and axle, which distance may be increased or decreased under compression or rebound. Referring to Figure 1, it will be seen that the arm 23 is assumed to extend horizontally forward and to be connected by the usual vertically disposed drag link to the axle.

The valves are assumed to be in their normal position as shown in Figure 1. It will be seen referring to Figure 6 that as the wheel and axle move downward due to the depression in the road, the body will also move downward but at a less rate than the axle, causing the piston 20 to move toward the left in Figure 1. At the same time, the casing 10 moves downward relative to the weighted valve 53 carrying with it the stem 38 and the latch 62 which snaps under the lug 64, latching the valve 53 in its relatively raised position, that is, in the position which it has kept because of its inertia. While this constricts the outlet through ports 42, yet as the piston is moving toward the left, there is no resistance presented to the movement of the piston, the liquid in front of the piston head 22 flowing out through port 46 and either up through the passages 45, 44 and 58 and out into the casing and back through ports 29 or up through the passages 47, 31, 48 and 55 back into the casing.

When the axle has traveled as far downward as possible, it begins to rise and moves the piston to the right, while the body tends to continue its downward movement. This downward movement is checked, however, by the fact that the ports 42 are only partially open and the downward movement of the body is retarded by the liquid in front of head 21 having to pass through these restricted orifices. The liquid cannot pass around by-pass passages 33, 30, 51 and 57 because ports 52 at this time are closed by valve 56, which is moving with the casing 10 or the body and not relative thereto. During this period, therefore, the valve 53 is held in its retarding position by the latch 62.

When the body ceases its downward movement, the valve 56, by its momentum, continues to move downward, relative to the casing 10, the stem 43 and latch 63 and the latch 63 engages over lug 65, latching the valve in its lowered position. This reduces the effective area of ports 59 so that upward movement of the body, due to the rebound of the usual vehicle springs, is checked or retarded. As valve 56 moves downward, arm 72 moves toward the right releasing valve 53 which drops to its lowered position. The valve 53 is released under these circumstances because the vehicle body is moving upward or away from the axle. Shaft 15 is starting to turn in a clockwise direction and piston 20 is moving to the left. Therefore, the arms 72 and rods 74 are moving to the right unlatching valve 53, this valve being latched by the lower end of the latch 62 engaging over the lug 64.

When the piston 20 first starts to the left as stated on page 3, line 45 due to the clockwise rotation of the shaft 15 caused by the axle moving away from the body, this same rotation causes control member 72 to move to the right because the friction saddle 69 tends to rotate with the shaft. Saddle 69 is prevented from rotating with shaft 15 but a small distance due to its right end striking the surface of the casing 14. Thus member 72 will remain stationary in its right hand position as long as the piston does not reverse its direction and move toward the right. The fact that members 72 and 74 are in their right hand position does not prevent latch 62 from engaging lug 64 since finger 62a on latch 62 will ride above and to the left of the abutment 78 on member 74. Member 74 will be relatively displaced downwardly in slot 76 but will be urged upwardly against finger 62a by spring 80. In order for latch 62 to release lug 64 the following events must take place. The shaft 15 must cease its clockwise rotation and start rotating in a counter-clockwise direction. This will shift members 72 and 74 to their left hand position. As they are doing so, when member 74 moves to the left the abutment 78 will snap up by the edge of finger 62a because of spring 80. Now the shaft 15 must again reverse its direction and start rotating in a clockwise direction. This will move members 72 and 74 to their right hand position once more, and this movement will cause abutment 78 to engage finger 62a and cause latch 62 to release lug 64, thus allowing valve 53 to return to its normal lowered open position.

The position of member 74 has no effect upon the ability of either latch 62 or latch 63 to engage their respective lugs. In order to cause either latch to release its lug, once it has engaged it, member 74 must move toward the latch to be released from its position on the opposite side of the assembly away from said latch. To illustrate, suppose the left hand latch 63 has engaged its lug 65. Then, in order for member 74 to release it, it is necessary for member 74 to move from the opposite or right hand side of the assembly toward the left or toward the latch 63, whereupon abutment 79 will engage finger 63a and release the latch. If the member 74 occupies any other position other than its right hand position then it is necessary for it to move to its right hand position and then move back to the left as described above in order to unlatch 63.

The member 74 has two limiting stationary positions, one to the extreme right and the other to the extreme left. These positions are fixed by the ends of the friction saddle 69 which bear against the surface of the casing on either side of the shaft 15 and sleeve 16. When the right end of 69 bears against the surface, member 74 will be in its left hand position.

Now suppose member 74 to be in its left hand position. This will have been caused by a previous counter-clockwise rotation of shaft 15. Now if shaft 15 stops its counter-clockwise rotation, member 74 will remain in its left hand position, but if shaft 15 now begins to rotate in a clockwise direction, saddle 69, due to its friction on sleeve 16, will turn with it a short distance and will carry members 72 and 74 to their right hand positions. Further clockwise rotation of shaft 15 or its ceasing to rotate will not cause any further movement of members 72 and 74, but if shaft 15 now reverses its direction and starts to rotate in a counter-clockwise direction, the saddle 69 will ride with it to the left until its left end bears against the surface of the casing whereupon the shaft will slide under the saddle for any further counter-clockwise rotation of the shaft. In moving to the left saddle 69 has, of course, carried members 72 and 74 from their right hand positions to their left hand positions and in so doing has unlocked latch 63 from engagement with lug 65 provided latch 63 has previously engaged said lug. If latch 63 has not previously engaged lug 65, member 74 will pass above finger 63a and will have no effect on latch 63.

As the body reaches its highest point of rebound and commences to move downward, arm 72 moves to the left unlatching the latch 63, releasing valve 56 which is returned to its normal position by its spring 61. Again valve 53 moves upward relative to the casing 10 and parts carried thereby and contracts ports 42 so that as the piston moves to the right, it moves against the resistance of the liquid passing through the constricted ports 42. It will, of course, be noted that as valve 56 has returned to its normal position, ports 52 are closed so that liquid cannot escape through the by-pass passages. This alternate action of the two valves 53 and 56 and alternate locking and unlocking of the valves continues until the vibrations of the body have died down until they are insufficient to cause the inertia valves to latch, thus leaving both valves unlatched and in their normal position.

In Figure 7, we illustrate diagrammatically the action of our shock absorber when the vehicle meets a short hump in the road. As the wheels meet the hump, the axle moves upward, shifting the piston to the right. As at this time, neither of the valves have closed, there is no impediment to the free movement of the piston. When the wheels are passing up over the hump, the body tends to move upward, causing the valve 56 to move downward and locking this valve in its lowered position. This occurs immediately that the body starts to move upward. As the body starts to move upward relative to the axle, the piston will move toward the left, and the liquid in front of the piston head 22 must pass through the constricted ports 59, the by-pass being closed at this time due to the fact that the valve 53 is in its lowered position. Thus the upward movement of the body is checked. When the body again tends to move downward, the arm 72 will shift to the left in Figure 1, releasing the latch 63 of valve 56 and at the same time, the inertia valve 53 remaining stationary while the body moves downward or, in other words, moving upward relative to the body, is latched by latch 62 in its relatively raised position. As the body moves downward, the piston will move toward the right in Figure 1 and as the valve 53 is moved relatively upward, the ports 42 are constricted and the downward movement of the body of the vehicle is checked or retarded. When the body has moved downward to its fully lowered position against the action of the springs, and the retarding effect of the absorber and starts upward again, the valve 53 is released and returned to its normal position, valve 56 moves downward and is latched in its downward position and as the piston moves to the left, it is checked by the liquid in front of the piston, as before described. This alternate action of the two valves and alternate locking and unlocking of the two valves continues until the vibrations have died as stated above.

In Figure 8 we illustrate diagrammatically the action of our shock absorber while the wheels are passing over a relatively long depression. Both valves are supposed to be in their normal open position until just after the wheels enter the depression. When the wheels enter the depression, they move downward and allow the body to move downward. This downward acceleration of the body causes all parts of the shock absorber which are rigidly attached to it to be accelerated in a downward direction. Weight 53, however, due to its inertia, resists this tendency of the vehicle body to accelerate it downward and, since it is slidably mounted on valve stem 38, it maintains its approximate original vertical position in space while all other parts of the mechanism move downward relative to it. After this relative movement has taken place, latch 62 engages over lug 64 and thus holds valve 53 in its new position relative to the other parts of the mechanism. Now if the vehicle body continues to move downward, stop ring 43a will bear upon the upper surface of valve 53 and cause whatever motion the body has to be communicated to the valve. This will overcome the inertia of weight valve 53 and, if it were not prevented from doing so by latch 62, weights 53 would return to its normal or open position relative to the remainder of the mechanism. The whole function of the latch is to hold the valve in the operated or closed position after the forces which placed it on that position have been overcome and have ceased to act upon it. The latch holds the weight valve in this position until the direction of the body movement relative to the axle is reversed, whereupon the latch is released by the mechanism previously described. During this time, the piston is moving toward the left, because the wheels are going down rapidly relative to the downward movement of the body. As the wheels and axle reach the bottom of the depression and move upward relative to the body, the piston moves toward the right and the constricted opening of valve 53 checks the movement of the piston and of the body. So far the operation is of the same character as has been heretofore described in passing over a short depression.

As the wheels continue to move up, however, the body starts to move up also and would tend to move up as fast as the wheels and axle due to the resistance of the fluid in the right hand end of the cylinder if this were not relieved. Just as the body moves upward, the momentum valve 56 is shifted to its constricted position and is latched, thus registering by-pass ports 52 and passages 51. Inasmuch as the body would tend to be moved upward by the wheels (if there were no by-pass provision), there will be no travel of the piston to the left and, therefore, no movement of the shaft 15 and of the arm 72 which would unlatch valve 53. Now if no provision were made for by-passing the liquid around the valve 53, the body would be pushed up by the resistance of the liquid unable to pass through the constricted opening of valve 53, the liquid would act as a liquid piston preventing relative movement of the body and axle and preventing the vehicle springs from absorbing the upward thrust of the axle. By providing the by-pass passage 33, the liquid on the right hand end of the cylinder 11 can pass out through the by-pass 33 and 38 and pass into the passage 51 of the valve stem 43 and out through the passages 52, thus permitting the piston to move toward the right, notwithstanding the fact that both valves are latched. This permits the vehicle springs to act freely. Because the by-pass around valve 53 and through valve 56 is open, the vehicle springs will act to cushion the movement of the body and the body will not be pushed up by the incompressible liquid in the shock absorber but only by the springs.

As the descending force of the body is checked and the body commences to move upward, as shown by the line B in Figure 8, the wheels may move upward more slowly than the body, that is, the body may rise relative to the axle and the piston will move to the left, the arms 72 moving to the right, unlocking the valve 53 which returns to its normal position, thus closing the by-pass through passages 48 and 55 and this leftward movement of the piston will be checked by valve 56. When the vehicle body has ceased its upward movement and commenced to move downward again relative to the axle, the shaft 15 will move the piston to the right. This immediately unlocks the valve 56 which returns to its initial position while the downward movement of the body causes the inertia valve 53 to shift relatively upward and latch, thus checking the movement of the piston toward the right and checking the downward movement of the body. This alternate action of the valves continues until the vibrations which are of large enough range to actuate the valves have subsided.

The slight irregularities in the road which are not of sufficient magnitude to cause the chassis to move up or down sufficiently to cause the inertia valves to operate are taken care of by the elasticity of the vehicle springs. Since both inertia operated valves are in their normal position, the slight up and down movements of the axle are not transmitted to the chassis except through the cushioning action of the vehicle springs.

Exactly the same action occurs but reversely as relates to the valves when the vehicle wheels move over a relatively long rise. In this case also the by-passes act to permit the axle of the vehicle to move downward and follow the contour of the road under the action of the springs without being held upward by the action of the liquid in the shock absorber.

When wheels run down into a depression, the valves are in their normal position and no retarding action takes place and there is no need of a by-pass but when the body moves downward, the valve 53 will be set and locked. Now when the wheels rise up out of the depression with the valve 53 latched, the unlatching rod 74 at this time will not be shifted in a direction to unlatch valve 53 and thus provision must be made for by-passing liquid or else the body will be forced upward by the wheels and given a severe jolt.

When the wheels run from a level up a long hump in the road, the valve 56 is set and the valve 53 is in normal position and there is no need at this time of by-passing the liquid but in coming off of this hump, the wheels move downward, the body also moves downward and this will set and latch the valve 53 and thus opens the by-pass by placing ports 49 and 55 in registry. Because the wheels and body are both moving downward, there is no unlatching action and unless a by-pass is provided the wheels could not follow the contour of the road but would be held up by the resistance of the valve 56 to the movement of the liquid, the vehicle springs would not function and when the wheels eventually struck the ground, there would again be a severe jolt. When the body starts downward, the valve 53 latches and opens the by-pass, thus relieving pressure in the left hand end of the cylinder, allowing the wheels to follow the contour of the roadway.

While we have heretofore referred to the valve 53 as an inertia operated valve and the valve 56 as a momentum operated valve, it will be understood that both valves in a sense are inertia operated and that the terms "momentum" and "inertia" operated have been used merely to distinguish the two valves. It is also pointed out that both of the valves are balanced valves and neither operated, retarded, nor affected in any way by fluid pressure or flow. While we have illustrated a cylinder with a piston and while this will be ordinarily used, we do not wish to be limited to this means for forcing liquid in either direction through the circulating system of the shock absorber as other means might be used for this purpose operated by the movement of the body and axle relative to each other. Neither do we wish to be limited to the use of liquid as the retarding agent as air or gas may be used under certain circumstances for this purpose.

It will be seen that the whole purpose of this invention and the main object thereof is to always communicate a movement or force of the axle through the shock absorbers to the chassis or body when such force is in the proper direction to check or resist any movement which the body may have at that time but never to transmit a force or movement from the axle through the shock absorbers to the chassis or body when such force or movement is in such a direction as will add to any movement which the chassis may have at that time.

While we have illustrated certain details of construction and certain arrangements of parts which have been found thoroughly effective in action, we do not wish to be limited to these details as obviously many changes might be made without departing from the spirit of the invention as defined in the appended claims.

Thus in Figure 9, we have shown a modification of the latching means in which the latch 63' is in the form of a pawl bearing against the side face of the valve 56 and bite on or clamping against this valve as the valve tends to move upward but permitting the descent of the valve under momentum. A pawl of the same character may be used with the valve 53. This will permit either valve to move slightly under momentum or inertia and be held in this slightly shifted position until released by the latch release 74. With the construction shown in Figure 9, the valves will move slightly to relatively slight irregularities in the road, thus restricting slightly the ports 42 or 59 and where the irregularities are greater the valves will move further and be latched in their shifted positions by the pawls and a greater restriction of the ports 42 and 59 will be secured.

While we have shown the partial registry of passages 54 and ports 42, yet this partial registry is not material. There have been many different kinds of inertia-controlled shock absorbers built in which the resistance of the shock absorber is controlled by weighted valves. Some of these shock absorbers are provided with one kind of a restricted opening and some with other kinds; some have needle valves; some metering pins or metering slots; some spring-loaded relief valves or like elements to provide the restriction of the fluid flow. Our inertia-operated valves simply provide a bypass around this restriction so that when the inertia valve is open, the fluid does not have to be forced through the restriction but can bypass around it through the open inertia-operated valve. However, when the equilibrium of the car is disturbed and the inertia-controlled valve is closed, the liquid must be forced through the restricted opening, whatever type is used, and this causes the increase in shock absorber resistance. In our drawing we have shown one possible type of restricted opening, that is, the restriction formed when the inertia-operated valve itself does not completely close. Other types might have been shown in which case the valve 53 would have moved so that passages 54 and ports 42 would be completely out of register. The type of construction employed and how it operates, is not material to the idea we wish to cover. It is also immaterial to our invention whether the degree of restriction of ports 59 is similar to the degree of restriction of ports 42 of valve 52 or not.

It will be seen that our invention primarily consists in three parts or three means. These are, first, means for retaining the inertia-operated valves, of any kind or form whatsoever, in their cut-off or flow-retarding positions after the force due to inertia and acceleration has become insufficient to keep them in this flow-retarding position; second, means for releasing these valves so that they may be returned to their open or non-retarding position; and third, means for by-passing either or both of these valves and thus nullifying their cut-off or retarding action at certain times when increased shock absorber resistance is not wanted but where the releasing means have not yet operated to release the valves. It is then our intention to apply any or all of these three means to any shock absorber which makes use of weighted valves designed to be acted upon by force due to inertia and acceleration regardless of the combination with these weighted valves of other valves, bypasses, pistons, vanes, channels, or openings.

We claim:

1. In a hydraulic shock absorber for vehicles, means operable by the relative movements of the vehicle body and of the axle for causing the fluid to move in one direction or the other through the body, a valve controlling the passage of fluid under said impulses, said valve being shiftable to a flow retarding position by the combined effect of inertia and acceleration and means for latching the valve in its retarding position until the expiration of a predetermined cycle of movements between the body and the axle.

2. In a hydraulic shock absorber, a piston movable in opposite directions by relative movements between the vehicle body and the axle, and a valve controlling the passage of fluid under the impulse of the piston, said valve being shiftable to a flow retarding position by inertia and acceleration and means for latching the valve in its retarding position until the expiration of a predetermined cycle of movements of the mechanism.

3. A hydraulic shock absorber for vehicles, including a body adapted to be mounted upon a vehicle body, means operable by the relative movements of the vehicle body and axle for causing the fluid within the shock absorber to move in one direction or the other through the body thereof, in opposite directions, means permitting an initial free movement of the axle relative to the body, inertia actuated means for retarding the movement of the fluid in one direction upon a downward movement of the body and functioning until the body has completed its movement, and momentum operated means then retarding the movement of the fluid in the opposite direction and functioning until the body has completed its movement in this direction.

4. In a hydraulic shock absorber for vehicles, a body containing fluid, means operable by relative movements between the vehicle body and the axle of the vehicle for causing the fluid to move in one direction or the other through the body, an inertia operated valve acting to check the downward movement of the body, a momentum operated valve acting to check the movement of the body in the opposite direction, and means for automatically latching each valve in its checking position and automatically releasing said latching means when the body moves to a predetermined position.

5. In a hydraulic shock absorber for vehicles, a piston movable in opposite directions by relative movements between the vehicle body and the axle, an inertia operated valve acting to check the movement of the fluid in the body due to a downward movement of the body, a momentum operated valve acting to check the movement of the fluid in the opposite direction due to a movement of the body in the opposite direction, and means for automatically latching each valve in its checking position and automatically releasing said latching means when the body has moved to a predetermined position.

6. In a hydraulic shock absorber for vehicles, a body containing fluid, means operable by relative movements between the body of the vehicle and its axle for causing the fluid to move in one direction or the other through the body, an inertia operated retarding valve shifted automatically to a retarding position when the body moves downward and when so shifted retarding the movement of fluid in one direction, a momentum operated retarding valve shifted to a retarding position when the body has completed its downward movement, said valve when so shifted retarding movement of the piston in the opposite direction, means for latching either one of said valves in its retarding position, and means for releasing said latching means when the retardation is complete.

7. In a hydraulic shock absorber, a cylinder adapted to be connected with a vehicle body to move therewith, a piston movable therein, means for operatively connecting the piston with the axle of the vehicle whereby relative movements of the body and axle will cause a reciprocation of the piston, the cylinder having fluid therein against which the piston acts, an inertia operated retarding valve shifted automatically to a retarding position when the body moves downward and when so shifted retarding the movement of fluid from one end of the cylinder, a momentum operated retarding valve shifted to a retarding position when the body has completed its downward movement and retarding the flow of fluid and of the piston in the opposite direction, means for latching either one of said valves in its retarding position when the body has completed its movement in one direction.

8. In a hydraulic shock absorber for vehicles, a body having a fluid circulating system, means for causing the fluid to move in one direction or the other through said circulating system by relative movements between the vehicle body and the axle, a valve controlling passage of the liquid in one direction under the impulse of said movement, said valve being shiftable to a flow retarding position by a vertical movement of the vehicle body, and means for latching the valve in retarding position until the flow in the direction of retardation is complete, and the fluid moves in a reverse direction.

9. In a shock absorber of the hydraulic type, a vibratory piston and piston chambers, the shock absorber having a circulating system through which fluid under the impulse of said piston moves in one direction or the other, inertia operated valves adapted to be successively shifted to a liquid retarding position upon a vertical movement of the body, and means for holding said valves in retarding position until after a change in the load on the vehicle springs.

10. In a shock absorber of the hydraulic type, a vibratory piston and piston chambers, the shock absorber having a circulating system through which fluid under the impulse of said piston moves in one direction or the other, inertia operated valves adapted to be successively shifted to a liquid retarding position upon a vertical movement of the body, and means for holding said valves in retarding position, and means whereby after a change in the load on the vehicle springs, the holding means will be released.

11. In a hydraulic shock absorber of the character described, a piston movable in opposite directions by relative movements between the vehicle body and the axle, an inertia operated valve controlling the passage of liquid under the impulse of the piston, said valve being adapted to be shifted to a flow retarding position by vertical movements of the vehicle body, means for retaining said valve in its operated or retarding position after the force of inertia has ceased to act upon said valve, and means acting to release said retaining means upon the expiration of a predetermined cycle of movement between the body and the axle whereby said valve is then allowed to return to its normal position.

12. In a hydraulic shock absorber of the character described, a body having a fluid circulating system, means for causing the fluid to move in opposite directions upon relative movements between the vehicle body and the axle, an inertia operated valve controlling the passage of liquid in one direction through said circulating system, said valve being capable of being shifted to a flow retarding position by vertical movement of the vehicle body, means for retaining said valve in its retarding position after the force of inertia has ceased to act upon the valve, and means releasing said retaining means upon the expiration of a predetermined cycle of movement between the body of the vehicle and its axle whereby the valve is then allowed to return to its normal position.

13. In a hydraulic shock absorber of the character described, a body having a fluid circulating system, means for causing a movement of the fluid in one direction or the other by relative movements between the vehicle body and the vehicle axle, an inertia operated valve controlling the passage of the fluid under the impulse of said vibrations in one direction, a momentum operated valve controlling the passage of fluid in the opposite direction, said valves being adapted to be shifted to a flow retarding position by downward movements of the vehicle body, means for retaining said valves in their retarding position after the force of inertia and momentum has ceased to act upon the valves, and means releasing said retaining means upon the expiration of a predetermined cycle of movements between the body and the axle and vehicle whereby to permit the valves to return to their normal position.

14. A hydraulic shock absorber of the character described having a fluid circulating system, means movable in opposite directions by relative movements between the vehicle body and the vehicle axle and causing the fluid to move in opposite directions through said circulating system, an inertia operated valve controlling the passage of the liquid in one direction, said valve being yieldingly maintained in a normal position permitting the free flow of liquid, but being adapted to be shifted to a flow retarding position by vertical movement of the vehicle body, means for retaining said valve in its retarding position after the force of inertia has ceased to act upon said valve, means acting to release said retaining means upon the expiration to a predetermined cycle of movements between the body and the axle, and automatic means nullifying the retarding action of the valve in its retarding position and by-passing the fluid flow around said valve when it becomes necessary to prevent a movement of the axle being added to and aggregating a corresponding movement to the body.

15. In a hydraulic shock absorber for vehicles, a piston movable in opposite directions by relative movements between the vehicle body and the axle, two inertia operated valves yieldingly supported each in its normal position, one valve controlling the passage of liquid under the impulse of liquid in one direction and the other for controlling the passage of liquid in the opposite direction, each one of said valves being capable of being shifted to a flow retarding position by vertical movement of the vehicle body, means for retaining each of said valves in its retarding position after the force of inertia has ceased to act upon said valves, means acting to release said retaining means upon the expiration of a predetermined cycle of movements between the body of the vehicle and the axle, and automatic means nullifying the retarding action of the valves when shifted to their retarding position, said means by-passing the fluid flow around said valves when it becomes necessary to prevent a movement of the axle being added to and aggregating a corresponding movement of the body of the vehicle.

16. In a hydraulic shock absorber of the character stated, a body formed to provide a cylinder and a circulating system from opposite ends of the cylinder, a piston movable in opposite directions within the cylinder, means for shifting said piston in opposite directions by relative movements between the vehicle body and the axle, hollow valve stems forming part of the circulating system and having outlet ports, weighted valves, each mounted upon one of said stems and having passages adapted when the valve is shifted to retard the passage of the liquid through the circulating system in one or the other directions, resilient means supporting said valves in normal positions with the ports open, one of said valves being shifted to its retarding position by the inertia of the valve as the body moves downward with the vehicle body, the other of said valves moving downward with the body but being shifted to its retarding position when the body stops its downward movement, latches engageable with said valves to hold the first named valve raised relative to the body and the second named valve in its depressed position, and means operated by reciprocations of the piston for releasing said retaining means upon the expiration of a predetermined cycle of movements between the body and the axle to thereby permit the valves to return to their normal position.

17. In a hydraulic shock absorber of the character stated, a body formed to provide a cylinder and a circulating system from opposite ends of the cylinder, a piston movable in opposite directions within the cylinder, means for shifting said piston in opposite directions by relative movements between the vehicle body and the axle, valve stems extending upward from the cylinder through the upper portion of the body, each of said valve stems having a duct extending upward toward the middle of the valve stem and forming part of the circulating system and having outwardly opening ports at its upper end and each of said valve stems having a duct extending downward from its upper end and having outwardly opening ports at the lower end of the duct, weighted valves shiftably mounted for vertical movement upon said stems, each of said valves having outwardly opening passages adapted when one valve is lowered to communicate with said ports in the corresponding valve stem, the passages in the other valve communicating with the ports in the corresponding valve stem when this last valve is raised, springs supporting the first named valve in a lowered position and the second named valve in a raised position, each of said valves having upper passages adapted to communicate with the upper ports in the respective valve stems when the first named valve is relatively raised on the valve stem and the second named valve is lowered on the valve stem, bypass passages in the top of said body communicating each with the upper end of one of said valve stems and with the opposite end of the cylinder, automatically actuated means for latching the first named valve in its raised position and the second named valve in its lowered position after the valves have been shifted, and means operated by reciprocations of the piston acting to release said latches upon the expiration of a predetermined cycle of movement between the body and the axle.

18. In a hydraulic shock absorber of the character stated, a body formed to provide a cylinder and a circulating system from opposite ends of the cylinder, a piston movable in opposite directions within the cylinder, means for shifting said piston in opposite directions by relative movements between the vehicle body and the axle, valve stems extending upward from the cylinder through the upper portion of the body, each of said valve stems having a duct extending upward toward the middle of the valve stem and forming part of the circulating system and having outwardly opening ports at its upper end and each of said valve stems having a duct extending downward from its upper end and having outwardly opening ports at the lower end of the duct, weighted valves shiftably mounted for vertical movement upon said stems, each of said valves having outwardly opening passages adapted when one valve is lowered to communicate with said ports in the corresponding valve stem, the passages in the other valve communicating with the ports in the corresponding valve stem when this last valve is raised, springs supporting the first named valve in a lowered position and the second named valve in a raised position, each of said valves having upper passages adapted to communicate with the upper ports in the respective valve stems when the first named valve is relatively raised on the valve stem and the second named valve is lowered on the valve stem, by-pass passages in the top of said body communicating each with the upper end of one of said valve stems and with the opposite end of the cylinder, automatically actuated means for latching the first named valve in its raised position and the second named valve in its lowered position after the valves have been shifted, and means operated by reciprocations of the piston acting to release said latches upon the expiration of a predetermined cycle of movement between the body and the axle, and including a saddle, a shaft for operating the piston with which the saddle is frictionally engaged for limited movement in either direction, an arm extending upward from the saddle, and a latch releasing rod loosely connected to said arm for lateral movement therewith but for free tilting movement and having shoulders adapted to engage each with one of said latches to release the latches upon reciprocations of the rod.

19. In a hydraulic shock absorber, a piston movable in opposite directions by relative movements between the vehicle body and the axle, an inertia operated valve controlling the passage of the liquid under the impulse of the piston in one direction, said valve being shiftable to a flow-retarding position by a vertical movement of the body, means for retaining said valve in its retarding position after the force of inertia has ceased to act upon said valve, and means for releasing said retaining means upon a reverse movement of the piston following completion of a stroke forcing fluid through the latched valve.

20. In a shock absorber, an inertia-operated shock absorbing element increasing the resistance of the shock absorber to relative movements of an axle and a body, and means for retaining the inertia-operated element in its retarding position until the expiration of a predetermined cycle of movement.

21. In a shock absorber, inertia-operated shock absorbing elements operating one on a downward movement of the vehicle body relative to the axle and the other upon an upward movement of the body relative to the axle, and means for retaining the shock absorbing elements in their retarding position until the expiration of a predetermined cycle of movement.

22. In a shock absorber, inertia-controlled shock absorbing elements operating one on a downward movement of the vehicle body relative to the axle and the other upon an upward movement of the body relative to the axle, means for retaining the shock absorbing elements in their retarding position until the expiration of a predetermined cycle of movement, and means for nullifying the action of said retaining means when both elements are in their retaining positions.

23. In an inertia-controlled hydraulic shock absorber having an inertia-operated shock absorbing element, means for retaining the element in its retarding position until the expiration of a predetermined cycle of movement between the body and the axle of a vehicle.

24. In an inertia-controlled hydraulic shock absorber for vehicles, the absorber having an inertia-operated valve, means for retaining the valve in its cut-off or flow-retarding position, and means for releasing said valve upon the completion of a predetermined cycle of movements between the body and the axle of the vehicle.

25. In an inertia-controlled shock absorber for vehicles, the absorber having an inertia-operated valve, means for latching the inertia-operated valve in its cut-off or flow-retarding position, and means operable by relative movement between the vehicle body and the axle for unlatching said valve upon the expiration of a predetermined cycle of movement between the body and the axle.

26. In an inertia-controlled hydraulic shock absorber for vehicles, the absorber having inertia-operated resisting means operating both on a downward movement and an upward movement of the vehicle body with relation to the axle, means for retaining each of the inertia-operated resisting means in their resisting positions, means for releasing said resisting means upon the expiration of predetermined cycles of movement between the vehicle body and the axle, and means acting to nullify the retarding action of one or the other of said resisting means when both means are in their retained positions.

27. In an inertia-controlled hydraulic shock absorber for vehicles, the absorber having two inertia-operated resisting valves operating one on a downward movement of the body with reference to the axle of the vehicle and the other upon an upward movement of the body with reference to the axle of the vehicle, means for retaining each of the valves in their cut-off or flow-retarding positions, means for releasing said valves upon the expiration of predetermined cycles of movement between the vehicle body and the axle, and bypassing means included in one of said valves operating to nullify the retarding action of the other of said valves when both valves are in their retained positions.

28. In an inertia-controlled shock absorber for vehicles, the absorber having two inertia-operated valves, one operating to retard the upward movement of the vehicle body with reference to the axle and the other operating to retard the downward movement of the vehicle body with reference to the axle, means for retaining each of the valves in its cut-off or flow-retarding position until the expiration of predetermined cycles of movement between the vehicle body and the axle, and means included in each of said valves operating to bypass and thereby nullify the flow-retarding action of the other of said valves when both valves are in their retained positions.

THOMAS A. KILLMAN.
ROBERT T. KILLMAN.